3,378,460
PROCESS FOR THE PRODUCTION OF β-CAROTENE

Leon Ninet and Jacques Albert Renaut, Paris, and Robert Charles François Tissier, Maisons-Alfort, France, assignors to Rhone-Poulenc S.A., Paris, France, a French body corporate
No Drawing. Filed Aug. 16, 1965, Ser. No. 480,145
Claims priority, application France, Aug. 17, 1964, 985,362; July 8, 1965, 23,958
7 Claims. (Cl. 195—28)

ABSTRACT OF THE DISCLOSURE

The use of isonicotinoylhydrazine and derivatives thereof to augment the production of β-carotene in aerobic fermentation in a culture medium is disclosed.

---

The present invention relates to an improved process for the production of β-carotene by fermentation.

It is known to obtain β-carotene by the submerged fermentation of microorganisms of the Choanephora or Blakeslea genus. Various publications have described the conditions which favour the production of β-carotene. Barnett et al. [Science, 123, 141 (1956)] have shown that the production of β-carotene is improved by the simultaneous culture of opposite forms of a single species. This study was then extended to the culture of opposite forms of different species [C. Hesseltine—Mycologia, 49, 449 (1957)]. The culture media were also examined and it was found that the addition of whole or hydroylsed grains, vegetable oils, surface-active agents, antioxidants and thickeners increased the yield of β-carotene [R. Anderson et al.—J. Agr. Food. Chem., 6, 543 (1948)], [A. Ciegler et al.—App. Microb., 7, 94 and 98 (1959)].

Finally, Mackinney et al. [J. Am. Chem. Soc. 74, 3456 (1952)] have shown that the addition of β-ionone to a static culture of a Phycomyces greatly increases the formation of β-carotene, to the detriment of other carotenoid pigments. Anderson et al. (loc. cit.) have observed the same effect in an agitated culture of Blakeslea and Choanephora microorganisms. β-Ionone as promoter can be replaced by other products, such as 2,2,6-trimethylcyclohexanone (French patent specification No. 1,325,656, filed February 22, 1962) or 2,6,6-trimethyl-1-acetylcyclohexene (French patent specification No. 1,377,-523, filed September 25, 1963).

We have now found that the addition of certain isonicotinoylhydrazine derivatives to culture media result in an improved production of β-carotene.

Accordingly the present invention provides a process for the production of β-carotene by the aerobic fermentation of the (+) and (−) forms of Blakeslea trispora (NRRL 2456 and NRRL 2457 respectively) in a culture medium comprising a source of assimilable carbon, a source of assimilable nitrogen, mineral salts and an isonicotinoylhydrazine derivative of the general formula:

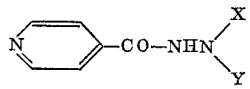

wherein either X represents a hydrogen atom and Y represents a hydrogen atom, an alkyl group of 1 to 8 carbon atoms, an aralkyl group of 7 to 12 carbon atoms, phenylsulphonyl or the radical

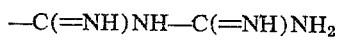

or X and Y together represent a group =$CHR^1$ wherein $R^1$ represents a dialkylamino group of 2 to 16 carbon atoms or a mononuclear 5- or 6-membered heterocyclic radical containing nitrogen or oxygen in the ring.

The isonicotinoylhydrazine derivatives can be added to the culture medium in quantities of from 0.1 to 10 g. per litre, at the commencement of or during fermentation, once or in several batches. It is preferred to use between 0.2 and 2 g. per litre and to add this at the commencement of culture. Whatever the addition and whenever it is made, it is desirable to continue the culture for 6 to 15 days after the seeding in order to obtain the maximum yield of β-carotene. The nature of the culture medium may vary but it will contain a source of assimilable carbon, a source of assimilable nitrogen and mineral salts in addition to the isonicotinoylhydrazine derivative and may also contain growth factors, antioxidants, surface-active agents, thickeners and promoters.

As source of assimilable carbon, it is possible to use carbohydrates, such as glucose, dextrins and starch and animal or vegetable oils such as lard oil, soya oil or cottonseed oil. Suitable sources of assimilable nitrogen are extremely varied: they may be chemical substances or complex substances containing mainly nitrogen in protein form, such as casein, lactalbumin, gluten and their hydrolysates, soya flour and peanut oil flour, yeast extracts, distillers' solubles, or corn steep liquor.

Various mineral salts may be added, some of which may have a buffering or neutralising effect such, for example, as the alkali or alkaline earth phosphates.

The growth factor which is most frequently employed is vitamin $B_1$ or thiamine but other known growth factors may be used. Among the anti-oxidants, reference may be made to N,N'-diphenyl p-phenylenediamine, 2,2,4-trimethyl-6-ethoxy-1,2-dihydroquinoline, ascorbic acid or sorbic acid. Surface-active agents, when used, are preferably of the non-ionic type, such as sorbitol derivatives with fatty acids, or products having a base of ethylene oxide condensates. Among the thickeners most usually employed are starch, carboxymethyl cellulose and gelose.

As promoter, it is possible to employ β-ionone, 2,2,6-trimethylcyclohexanone or 2,6,6-trimethyl-1-acetylcyclohexene.

The culture medium containing the essential ingredients and optional additives is seeded with a culture of the (+) and (−) forms of Blakeslea trispora (NRRL 2456 and 2457).

The increase in the rate of production of β-carotene in the presence of isonicotinoylhydrazine or of one of its derivatives depends to some extent on the working conditions, but there is an increase whether or not antioxidants or promoters are added to the culture media.

The following examples serve to illustrate the invention.

EXAMPLE 1

A culture medium A is prepared as follows: 500 cc. of water containing 75 g. of distillers' solubles are brought to boiling point in 15 minutes. After cooling, there are added:

| | | |
|---|---|---|
| Starch | g. | 70 |
| Soya oil | cc. | 40 |
| Cottonseed oil | cc. | 40 |
| Yeast extract | g. | 1 |
| Potassium dihydrogen phosphate | g. | 0.5 |
| Manganese sulphate monohydrate | g. | 0.1 |
| Thiamine hydrochloride | g. | 0.01 |

The volume is made up to 1000 cc. with distilled water. The pH of the mixture is adjusted to 6.3 with a few drops of 10 N sodium hydroxide solution. 50 cc. portions of the medium are placed in 300 cc. Erlenmeyer flasks which are then sterilised for 20 minutes at 120° C. After sterilisation and cooling each flask, there is added thereto, in sterile manner, 1 cc. of a sterile solution of 2,2,4-trimethyl-6-ethoxy-1,2-dihydroquinoline, 2.5% in petroleum.

Flasks containing media B and C are also prepared from the same ingredients and in the same manner as described for the preparation of flasks containing medium A, but adding to each flask, after sterilisation of the medium, in addition to the anti-oxidant in solution in petroleum, the following quantities of a sterile 5% isonicotinoylhydrazine solution in water:

Medium B: 0.1 cc.
Medium C: 1 cc.

Each flask containing the media A, B and C is then seeded with 5 cc. of a stirred culture containing the (+) and (−) forms of *Blakeslea trispora* (NRRL 2456 and NRRL 2457), 48 hours old. The flasks are then placed on a rotary stirring table rotating at 220 r.p.m. in an oven at 26° C. After 10 days culture under these conditions the production of $\beta$-carotene is at its maximum in all the flasks.

The determination of the $\beta$-carotene is effected as follows: the mycelium is separated by filtration, washed with water and then dried overnight at 35° C. in vacuo. The dry mycelium is then extracted with hexane. The $\beta$-carotene is separated from the other carotenoids which are present by chromatography of the extract on alumina. The fractions containing the $\beta$-carotene are recombined and measured by spectrophotometry with respect to a pure sample of $\beta$-carotene.

The following results were obtained:

|  | Mg./l. $\beta$-carotene |
|---|---|
| Medium A (without isonicotinoylhydrazine additive) | 980 |
| Medium B (with 0.1 g./l. of isonicotinoylhydrazine) | 1630 |
| Medium C (with 1 g./l. of isonicotinoylhydrazine) | 1950 |

EXAMPLE 2

Culture media A and C are prepared and seeded as indicated in Example 1. After seeding and incubation for 48 hours under the conditions described in Example 1, each cultural flask has added thereto in sterile manner a solution of 50 mg. of $\beta$-ionone in 0.5 cc. of petroleum. The cultures are allowed to ferment and are then analysed under the conditions described in Example 1.

The following results were obtained:

|  | Mg./l. $\beta$-carotene |
|---|---|
| Medium A (without isonicotinoylhydrazine additive) | 1050 |
| Medium C (with 1 g./l. of isonicotinoylhydrazine) | 2050 |

EXAMPLE 3

Flasks containing medium A are prepared as described in Example 1.

Flasks containing media D and F are prepared in the same manner as described for flasks containing medium A, but adding to each flask, after sterilisation of the medium, and in addition to the anti-oxidant in solution in petroleum, the following quantities of a 5% sterile solution of 1-isonicotinoyl-2-isopropylhydrazine in water:

Medium D: 0.1 cc.
Medium F: 1 cc.

Each flask containing the media A, D and F is then seeded with 5 cc. of a stirred culture containing the (+) and (−) forms of *Blakeslea trispora* (NRRL 2456 and NRRL 2457), 48 hours old. The flasks are then placed on a rotary stirring table rotating at 220 r.p.m. in an oven at 26° C. After 12 days culture under these conditions the production of $\beta$-carotene is at its maximum in all the flasks.

The determination of $\beta$-carotene is carried out as described in Example 1.

The following results were obtained:

|  | Mg./l. $\beta$-carotene |
|---|---|
| Medium A (without isonicotinoylhydrazine additive) | 1065 |
| Medium D (with 0.1 g./l. of 1-isonicotinoyl-2-isopropylhydrazine) | 1565 |
| Medium F (with 1 g./l. of 1-isonicotinoyl-2-isopropylhydrazine) | 2440 |

EXAMPLE 4

Flasks containing culture media A and F are prepared and seeded as indicated in Example 3. After seeding and incubation for 48 hours under the conditions described in Examples 1 and 3, each culture flask containing medium A has added thereto in sterile manner a solution of 50 mg. of $\beta$-ionone in 0.5 cc. of petroleum, while each flask of medium F has added thereto either 50 mg. of $\beta$-ionone in solution in 0.5 cc. of petroleum or 50 mg. of 2,6,6-trimethyl-1-acetylcyclohexene (TMACH) in solution in 0.5 cc. of petroleum. The cultures are then pursued for 10 days, and then analysed under the conditions described in Example 1.

The following results were obtained:

| Media, Reference | Additive | Production of $\beta$-carotene in mg./l. | |
|---|---|---|---|
|  |  | With ionone, 1 g./l. | With TMACH, 1 g./l. |
| A |  | 1,905 |  |
| F | 1-isonicotinoyl-2-isopropylhydrazine, 1 g./l. | 3,560 | 3,770 |

EXAMPLE 5

Other culture media are prepared in the same manner as medium F of Example 3, but replacing the 1-isonicotinoyl-2-isopropylhydrazine by other 2-substituted derivatives of isonicotinoylhydrazine in solution in water and in the quantities indicated below.

These new media are seeded at the same time as a reference medium A as described above, and a medium F and the cultures are developed under the conditions described in Example 1.

After 12 days of culture, the $\beta$-carotene is determined as described in Example 1. The results are set out in the following table. By convention, the coefficient 100 has been allotted to the production of $\beta$-carotene with the comparison medium A. The coefficients allotted to the media containing isonicotinoylhydrazine derivatives according to the invention thus show the increase in the production of $\beta$-carotene with respect to the comparison medium.

| Isonicotinoylhydrazine derivative which is used | Quantity added in g./l. | Production coefficient of $\beta$-carotene |
|---|---|---|
| Nil (medium A) |  | 100 |
| 1-isonicotinoyl-2-isopropylhydrazine (medium F) | 1 | 229 |
| 1-isonicotinoylaminobiguanide $\left[ N\diagup\!\!\!\diagdown\!\!\!-CO-NHNHC(=NH)NH-C(=NH)NH_2 \right]$ | 1 | 262 |
| 1-isonicotinoyl-2-dimethylaminomethylidene hydrazine $\left[ N\diagup\!\!\!\diagdown\!\!\!-CO-NHN=CHN(CH_3)_2 \right]$ | 1 | 124 |

EXAMPLE 6

As in Example 5, culture media are prepared in the same manner as the medium F of Example 3, but replacing the 1-isonicotinoyl-2-isopropylhydrazine by other derivatives of isonicotinoylhydrazine in solution in water and in the quantities indicated below.

The new media are seeded at the same time as a reference medium A described in Example 1 and as a medium F described in Example 3, and the cultures are incubated under the conditions described in Example 1.

After incubation for two days, a solution of 50 mg. of β-ionone in 0.5 cc. of petroleum is added to the flasks of each medium. The cultures are then incubated for another 10 days. The β-carotene is then determined as described in Example 1. The results are set out in the following table, adopting the same convention as in Example 5, namely, allotting the coefficient 100 to the production of β-carotene of the comparison medium A; the coefficients of the other media then correspond to the increase in production of β-carotene with respect to this comparison medium.

| | |
|---|---|
| Starch _____ kg__ | 19.2 |
| Soya oil _____ l__ | 9.6 |
| Cottonseed oil _____ l__ | 9.6 |
| Manganese sulphate monohydrate _____ kg__ | 0.064 |
| 2,2,4-trimethyl-6-ethoxy-1,2-dihydroquinoline as a 50% solution in ethanol (weight:volume) __ l__ | 0.224 |
| Thiamine hydrochloride as a 1 g./l. solution in water _____ l__ | 0.160 |

The volume is adjusted to 285 litres with water and the pH of the mixture is adjusted to 6.35 with 1.1 litres of 10 N sodium hydroxide solution. The medium is sterilised by heating for 55 minutes at 122° C. with bubbling of steam. After cooling, the pH is 5.85 and the volume is 310 litres.

A solution of 0.192 kg. of isonicotinoylhydrazine in 3 litres of water and then 6.4 litres of petroleum filtered to be made sterile are then added in sterile manner. The fermentation vessel is then seeded with 32 litres of an inoculum culture of the (+) and (−) forms of *Blakeslea trispora* (NRRL 2456 and 2457), 48 hours old. The culture is developed at 26° C. while stirring with a turbo-

| Isonicotinoylhydrazine derivative which is used | Quantity added in g./l. | Production coefficient of β-carotene |
|---|---|---|
| Nil (medium A) | | 100 |
| 1-isonicotinoyl-2-isopropylhydrazine (medium F) | 1 | 187 |
| 1-isonicotinoyl-2-heptylhydrazine 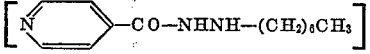 | 0.5 | 177 |
| 1-isonicotinoyl-2-benzylhydrazine 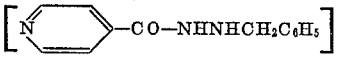 | 0.5 | 169 |
| 1-isonicotinoyl-2-benzenesulphonylhydrazine 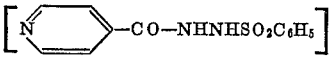 | 1 | 164 |
| 1-isonicotinoylaminobiguanide 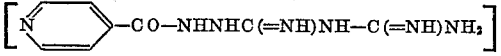 | 1 | 175 |
| 1-isonicotinoyl-2-dimethylaminomethylidene hydrazine 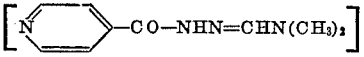 | 0.75 | 134 |
| 1-isonicotinoyl-2-(4-pyridylmethylidene)hydrazine  | 2 | 150 |
| 1-isonicotinoyl-2-furfurylidene hydrazine 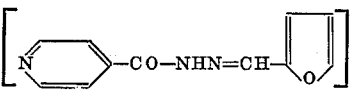 | 0.2 | 142 |
| 1-isonicotinoyl-2-(2-methyl-3-hydroxy-5-hydroxymethyl-4-pyridylmethylidene)hydrazine 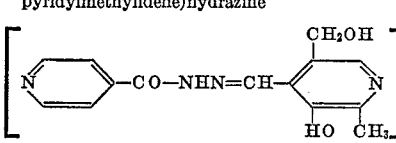 | 2 | 127 |

EXAMPLE 7

22.4 kg. of distiller's solubles are placed in a fermentation vessel of 800 litres capacity and containing 200 litres of water brought to 90° C. The mixture is stirred, while keeping the temperature at 90° C., for 10 minutes. After cooling to 30° C. there are added:

mixer rotating at 210 r.p.m. and aerating with 25 cubic metres of sterile air per hour.

A sterile solution of 0.320 kg. of β-ionone in 1.6 litres of petroleum is added in sterile manner after 48 hours incubation and there is initiated a continuous addition of a sterile aqueous solution of monohydrated glucose at 580 g./l. The device permitting the addition of the glucose solution has a delivery of 230 cc. per hour. The culture is then continued under the same aeration, stirring and temperature conditions for 5 more days after the addition of β-ionone. On stopping the culture, 26 litres of solution or 15 kg. of monohydrated glucose have been introduced into the fermentation vessel.

The β-carotene produced in the fermentation is measured as described in Example 1 and the yield is found to be 2560 mg./l. of β-carotene.

To crystallise the β-carotene which is produced an aliquot portion of the fermentation liquor may be treated as follows:

7.4 litres of fermentation liquor containing 19 g. of β-carotene are filtered and the mycelium recovered is washed with water and then dried overnight in vacuo at 45° C. The dry mycelium is extracted with 4500 cc. of methylene chloride and the extract which is obtained is concentrated to a volume of 300 cc. 300 cc. of normal butanol are then added to the concentrate to crystallise the β-carotene. The crystals are separated, washed and dried; they weigh 15.7 g. and contain 95% of β-carotene.

What we claim is:

1. Process for the production of β-carotene comprising aerobically fermenting the (+) and (−) forms of *Blakeslea trispora* (NRRL 2456 and NRRL 2457 respectively) in a culture medium comprising a source of assimilable carbon, a source of assimilable nitrogen, mineral salts and isonicotinoylhydrazine.

2. Process for the production of β-carotene comprising aerobically fermenting the (+) and (−) forms of *Blakeslea trispora* (NRRL 2456 and NRRL 2457 respectively) in a culture medium comprising a source of assimilable carbon, a source of assimilable nitrogen, mineral salts and an isonicotinoylhydrazine derivative of the general formula:

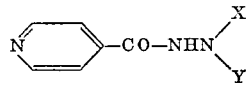

wherein either X represents a hydrogen atom and Y represents a member selected from the group consisting of a hydrogen atom, an alkyl group of 1 to 8 carbon atoms, an aralkyl group of 7 to 12 carbon atoms, phenylsulphonyl and the radical —C(=NH)NHC(=NH)NH$_2$, or X and Y together represent a group =CHR$^1$ wherein R$^1$ represents a member selected from the group consisting of dialkylamino group of 2 to 16 carbon atoms and a mononuclear 5- or 6-membered heterocyclic radical containing nitrogen or oxygen in the ring.

3. A process according to claim 2, wherein the culture medium contains 0.1 to 10 g. per litre of isonicotinoylhydrazine derivative.

4. A process according to claim 3, wherein the culture medium contains 0.2 to 2 g. per litre of isonicotinoylhydrazine derivative.

5. Process for the production of β-carotene comprising aerobically fermenting the (+) and (−) forms of *Blakeslea trispora* (NRRL 2456 and NRRL 2457 respectively) in a culture medium comprising a source of assimilable carbon, a source of assimilable nitrogen, mineral salts and 0.2 to 2 g. per litre of an isonicotinoylhydrazine derivative of the general formula:

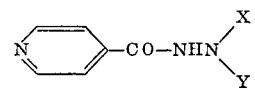

wherein X represents a hydrogen atom and Y represents a member selected from the group consisting of a hydrogen atom, an alkyl group of 1 to 8 carbon atoms, an aralkyl group of 7 to 12 carbon atoms, phenylsulphonyl or the radical —C(=NH)NHC(=NH)NH$_2$ and X and Y together represent a group =CHR$^1$ wherein R$^1$ represents a member selected from the group consisting of a dialkylamino group of 2 to 16 carbon atoms and a mononuclear 5- or 6-membered heterocyclic radical containing nitrogen or oxygen in the ring, the fermentation being continued for 6 to 15 days after the isonicotinoylhydrazine derivative has been added to the culture medium.

6. A process according to claim 2 wherein the fermentation is continued for 6 to 15 days after isonicotinoylhydrazine compound has been added to the culture medium.

7. A process as claimed in claim 1 wherein the culture medium contains 0.1 to 10 g. per litre of isonicotinoylhydrazine.

References Cited

UNITED STATES PATENTS 3,235,467    2/1966    Ninet et al. _____ 195—28

ALVIN E. TANENHOLTZ, *Primary Examiner.*